Feb. 16, 1960  J. R. HOWE  2,925,043
BOOSTER PUMP
Filed Sept. 11, 1956  3 Sheets-Sheet 2
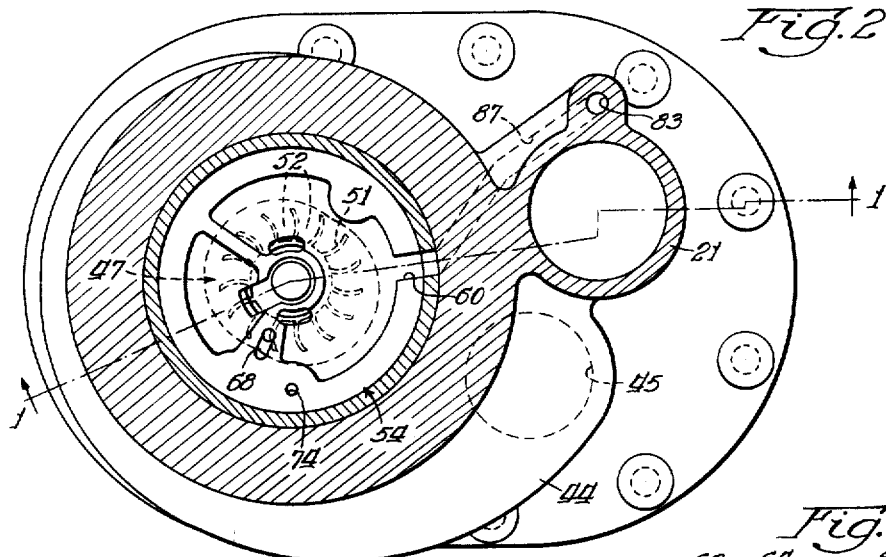
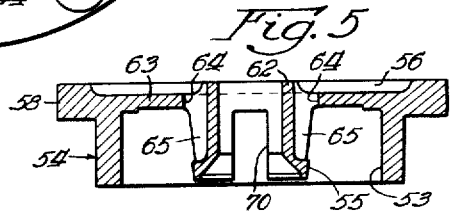
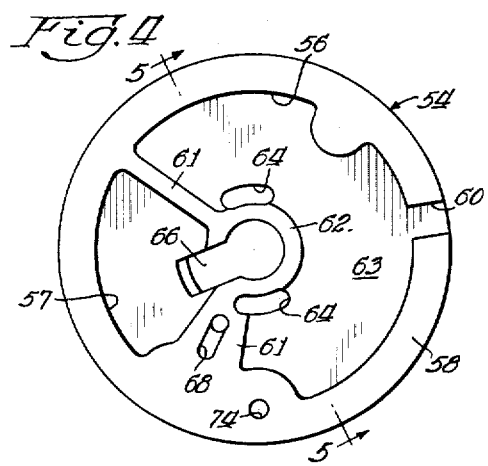
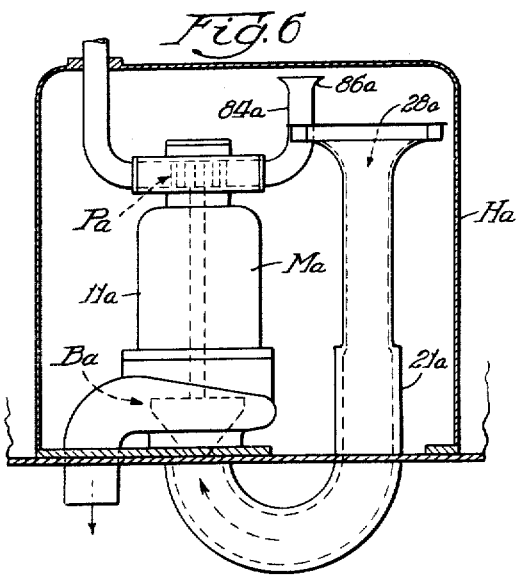
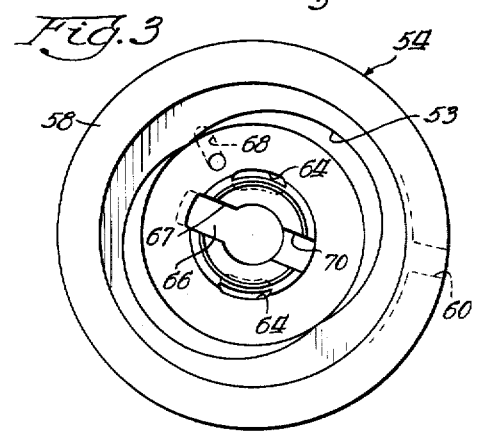
Inventor:
John R. Howe
By: Joseph R. Dwyer Atty.

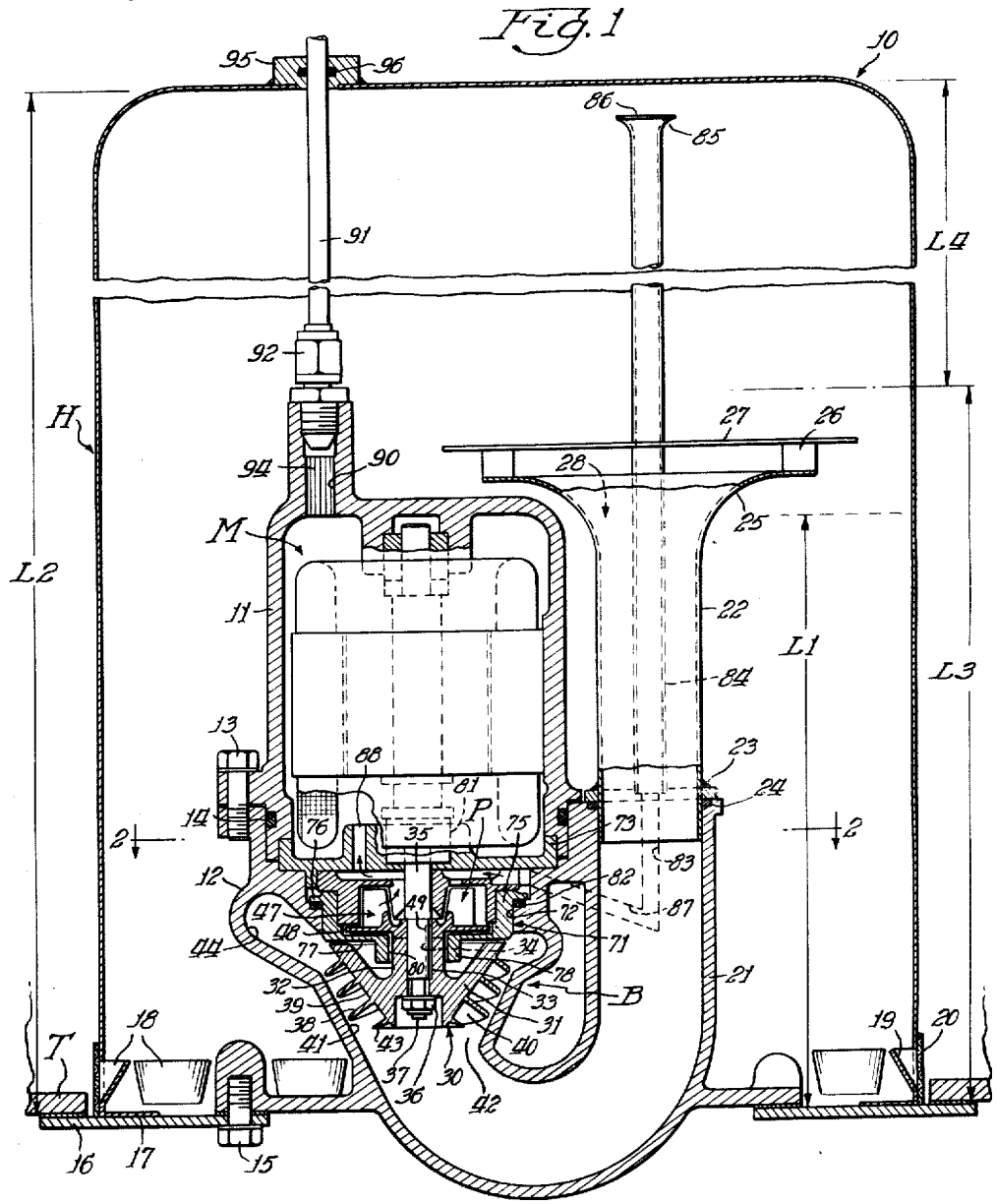

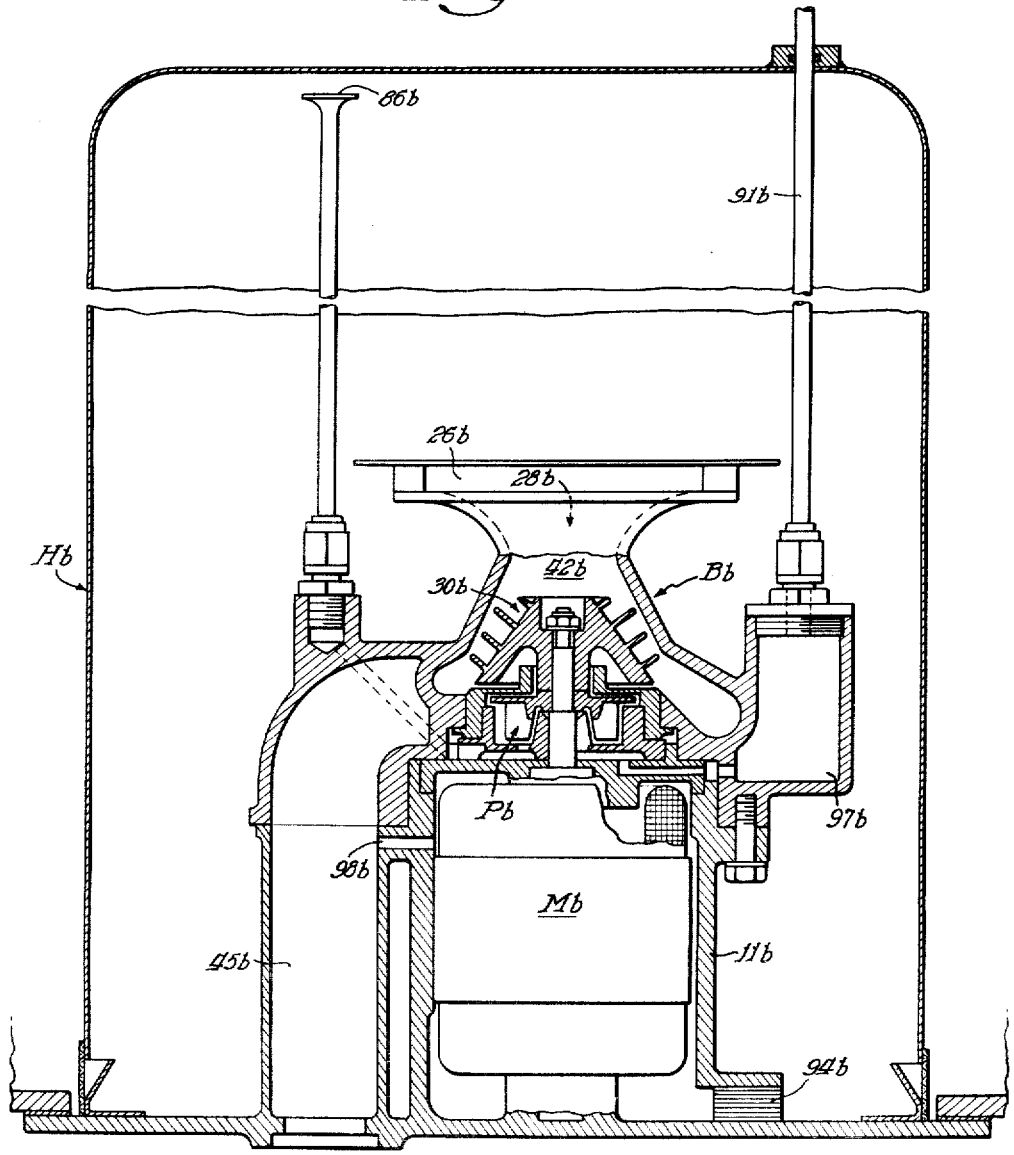

United States Patent Office 2,925,043
Patented Feb. 16, 1960

2,925,043

BOOSTER PUMP

John R. Howe, Solon, Ohio, assignor to Borg-Warner Corporation, Chicago, Ill., a corporation of Illinois Application September 11, 1956, Serial No. 609,271

15 Claims. (Cl. 103—113)

This invention relates in general to the pumping of liquid, and is particularly concerned with an improvement in booster pumps for delivering high volatile fuel from a source, such as an aircraft tank, to an engine fuel pump or to a point of consumption, such as the aircraft engine itself.

In the continued development of aircraft for higher altitudes, faster acceleration and better maneuverability, it has been found that prior art booster pumps lack ability for continued operation under all flight conditions. For example, when prior art booster pumps are mounted in an aircraft wing tank such pumps have been found not to operate satisfactorily in inverted flight conditions, in negative G, or in inverted negative G flight conditions because the pump inlet will become airblocked or starved causing aircraft engine failure.

However, in the co-pending U.S. application of James A. Compton, Serial No. 509,764, filed May 20, 1955, now Patent No. 2,845,871, entitled "Mixed Flow Booster Pump," there is disclosed a very practical and satisfactory fuel booster pump for operating under these adverse conditions by having an ability of self-priming. As explained therein, in the event that in certain angles of aircraft operation the fuel level in the tank drops below the level of the pump inlet, upon return to normal horizontal flight conditions the pump inlet will not be blocked by air or vapor so as to starve the pump and cause failure of the aircraft by reason of its ability to be self-priming.

The present invention relates to a modification or improvement over the type of fuel booster pump described and claimed in that application in that my present booster pump is so constructed and arranged that the prime of the booster pump is constantly maintained and a source of fuel for the pump inlet is ever present regardless of the fuel level in the main tank of the aircraft and regardless of the flight conditions.

Accordingly, a primary object of my invention is the provision of a booster pump assembly meeting the needs of the aircraft industry which can be mounted in a wing tank and having the ability of maintaining a prime for the pump and a source of fuel regardless of the fuel level in the wing tank and the flight conditions.

In the preferred form of booster pump assembly in which my present invention may be applied I will describe the same as applied in connection with a new and improved mixed flow booster pump described and claimed in the co-pending application of Thomas Lock Serial No. 466,562, filed November 3, 1954, entitled "Mixed Flow Booster Pump" and in connection with the booster pump assembly described and claimed in the co-pending patent application of James A. Compton, Serial No. 509,764, filed May 20, 1955, entitled "Mixed Flow Booster Pump." It will be understood, however, that the description of my present invention as applied to the above identified mixed flow booster pump assemblies is solely for the purpose of illustration, as my present invention may be adapted for the problem of maintaining prime of the pump and continuous fuel supply under varying conditions involved.

In the Thomas Lock co-pending application and in the Compton application there is described a fuel booster pump assembly capable of pumping fuel, usually a mixture of liquid and vapor from a fuel container, such as a wing tank of an aircraft, to an internal or external discharge line for ultimate use by an aircraft engine. As further explained in these applications, by providing a fuel booster pump assembly housing with an improved impeller having a plurality of spiral vanes or blades so positioned and proportioned to effectively cooperate with the vapor laden fuel and so positioned and proportioned to define therebetween passages of decreasing cross-sectional area at increasing distances from the axis of rotation, the liquid vapor mixture of fuel as it is drawn into and forced through the pumping chamber, is subjected to continuously increasing pressure and continued condensation thereby reducing the vapor content of the liquid vapor mixture.

In more particularly in the Compton application there is described a booster pump assembly utilizing the booster pump principles involved in the Lock application with an additional means for initially removing the air block in the discharge line of the booster pump, for initially providing suction in the discharge line to draw fuel into the booster pump inlet, and for continuously withdrawing a portion of the fuel in the booster pump discharge line thereby reducing the high pressure in the booster pump discharge line. This means provides the pump with ability to be self-priming and is accomplished by connecting the inlet of the second pump, commonly driven on the driving shaft of the mixed flow impeller, with the mixed flow pump discharge line. As an illustration of one type of second pump which can be employed to accomplish the desired function in the booster pump assembly reference was made to the expired United States Patent No. 1,718,294 issued June 25, 1925 to I. C. Jennings wherein there is shown and described a pump commonly known as a liquid seal pump.

In my present invention and to accomplish the primary objection thereof, I propose to utilize the mixed flow impeller shown and described in the co-pending Lock application, above identified, and the second or liquid seal pump as referred to in the Compton application, above identified, commonly driven on the same driving shaft as therein described, with an additional improvement in that both are mounted within a bell-shaped enclosure tank which completely surrounds both pumps with the inlets of both pumps functionally cooperating with the bell-shaped enclosure all of which are to be mounted completely submerged within a fuel tank. The second pump provides a means of maintaining a source of fuel within the enclosure formed by the bell tank and the inlet to the mixed flow booster pump is so arranged as to be completely submerged at all times within this supply of fuel within the bell tank regardless of the level of fuel in the wing tank and regardless of flight conditions. The inlet to the second pump and the inlet to the mixed flow pump are suitably arranged within the enclosure and with respect to each other to accomplish the primary object of my invention as will be explained in more detail hereinafter.

As a further refinement of one embodiment of my present invention fuel withdrawn from the bell tank by the secondary or liquid seal pump is discharged into the housing of the electric motor conjointly driving the impeller of the booster pump and the rotor of the second pump to maintain the interworking parts of the motor continuously submerged in fuel thereby preventing the possibility of fire. Fuel in the motor housing serves to provide the re-prime of the liquid seal pump when necessary.

In general, therefore, my present invention has for its broad aspects an improved construction of a fuel booster assembly incorporating a means which will make the pump assembly maintain its prime and provide a continuous supply of fuel to its inlet regardless of the level of fuel in the main tank and regardless of the flight conditions of the aircraft.

A still further object of my invention is the provision of an improved construction of a fuel booster pump assembly providing a greater cooling of the driving means.

Still another goal of my present invention is the provision of a fuel booster pump assembly of the mixed flow type incorporating a second pump both of which are enclosed within a bell tank and arranged in such a manner that the second pump provides in cooperation with the bell tank a continuous source of fuel supply for the inlet of the main mixed flow pump.

Still another and important aspect of my invention is the provision of a new and improved construction of a fuel booster pump assembly incorporating a mixed flow type impeller and a liquid seal type rotor disposed in tandem and driven in unison on a common drive shaft all of which are disposed within an enclosure whereby the liquid seal pump assures a supply of fuel within the enclosure which in turn provides a continuous supply of fuel to the inlet of the mixed flow pump.

Other and more particular objects, advantages and uses of my invention will become more apparent from the reading of the following description taken in connection with the accompanying drawings which form a part hereof and wherein:

Figure 1 is an elevational sectional view of one embodiment of my invention taken on line 1—1 of Figure 2, looking in the direction of the arrows;

Figure 2 is a cross-sectional view taken on line 2—2 of Figure 1 and illustrating in section the second pump incorporated in my invention;

Figure 3 is a bottom plan view of the liquid seal pump lobe cone;

Figure 4 is a top plan view of the liquid seal pump lobe cone;

Figure 5 is a cross-sectional view of the liquid seal pump lobe cone taken along line 5—5 of Figure 4;

Figure 6 is an elevational view, on a reduced scale, illustrating a second embodiment of my invention; and Figure 7 is an elevational view, on reduced scale, illustrating a third embodiment of my invention.

In the various views of the drawings the same reference character is employed to refer to the same part.

Referring now to the Figures 1 and 2 of the drawings, there is illustrated the vertically mounted fuel booster pump assembly, indicated in its entirety by 10, comprising an electric motor M remotely controlled in any conventional manner, a mixed flow type booster pump B and a second or liquid seal type pump P. Booster pump B, liquid seal pump P and electric motor M are operatively and functionally enclosed within a bell-shaped housing or tank H in the manner shown. Housing 11, containing the working parts of the motor M, and the housing 12, containing the working parts of the booster pump assembly B and the second or liquid seal pump P, are connected by means, such as bolts 13, and means, such as an O-ring seal 14, is provided between the housings to prevent the escape of fluid therebetween. The combined housings 11 and 12 are suitably attached to the bottom of a fuel tank T, such as a wing tank in an airplane by suitable means, such as bolts 15, through a base or plate means 16 which in turn is suitably attached in any convenient manner to the wing tank or fuel container T. The opened end of the bell housing H is provided with an inwardly extending flange or bottom portion 17 which lies contiguous with the plate 16 and suitably affixed to the plate means 16 in any convenient manner. Immediately above the inwardly extending flange 17 so as to be adjacent to the bottom of the tank T, the bell-shaped housing H is provided with a plurality of bell tank inlets 18, which in the embodiment shown, are inwardly extending wall-like members 19 formed by punching out portions of the bell-crank housing. Fuel in the main tank T is permitted to enter these bell tank inlets 18 through conventional screen means 20 to fill the cavity or enclosure formed by the bell tank H as will be explained in more detail hereinafter. Pump housing 12 is provided with a vertically extending, elongated, tubular inlet conduit 21 which is in turn connected at one end with a tubular inlet conduit 22. Suitable means, such as welding 23 and O-ring seals 24 are provided between the tubular conduit 22 and the inlet conduit 21 to prevent leakage therebetween. The end of tubular inlet conduit 22 opposite from the inlet conduit 21 is flared radially outwardly as indicated at 25 and there is provided relatively short U-shaped spacer-like means 26 which space a solid inlet baffle plate 27 from the flared portion 25 to provide a main booster pump inlet 28. The purpose of the baffle plate is to reduce turbulence of the fuel within the cavity formed by the bell-shaped housing H and obviously the spacer members 26 are suitably located to provide a free-flow of fuel into the booster pump inlet 28.

The booster pump B is substantially the same as that described and claimed in the aforementioned co-pending Lock application and comprises an impeller, indicated in its entirety by 30, having a cone-shaped portion 31 and an axially extending, internally-splined, cylindrical portion 32, the splines 33 of which cooperate with an externally splined portion 34 of motor shaft 35, to provide a driving connection therebetween. The impeller 30 is retained in its proper operating position on shaft 35 by means of a nut 36 received on the threaded portion 37 of the shaft.

The impeller 30 is provided with a plurality of spiral vanes 38, the number depending upon the volume of fuel to be pumped, extending substantially perpendicular to the surface 39 of the cone-shaped portion 31, thereby defining substantially rectangular grooves or passages 40 between the vanes 38, a cross-section of which becomes increasingly smaller from inlet to discharge because of the difference in angular inclination of the inner housing wall 41 and the wall or surface 39 of the impeller body relative to the axis of rotation of the impeller. Fuel or fuel vapor mixture entering the pumping inlet 42 of the booster pump from the inlet conduit 21 is carried from the inlet edges 43 of the vanes 38 to discharge into a volute or scroll 44 having a vertically extending discharge portion 45 (see Figure 2) to a point of consumption, or to a fuel pump, or directly to the aircraft engine itself. The grooves or passages 40, having an increasingly smaller cross-section from inlet to discharge, present an increasing diminishing area to the fuel or fuel vapor mixture flow, so that pressure is imposed on the fuel or fuel-vapor mixture in its spirally axial travel from the inlet of the booster pump until it is discharged into the scroll 44 with a resulting increase in pressure being imposed upon the liquid-vapor fuel, so that not only is a compression imparted thereto, but condensation of the vapors of the liquid-vapor mixture occurs.

The liquid seal pump P comprises a rotor indicated in its entirety at 47, having an annular plate like portion 48, keyed at 49 or otherwise secured to the motor shaft 35, for conjoint rotation, and having a plurality of axially extending curved vanes 51 (see Figure 2) defining chambers 52 therebetween. The rotor 47 is received in a generally elliptical or double lobe pumping chamber 53 in a radially and axially fixed, substantially cylindrical lobe cone 54 (see Figures 3, 4 and 5) having an axially extending truncated cone-shaped portion 55 within the pumping chamber surrounding and spaced from the motor shaft 35 and about which the vanes 51 rotate.

The lobe cone 54, in addition to the pumping chamber, is provided with a liquid seal pump inlet chamber 56 and a liquid seal pump discharge chamber 57, the chambers 56 and 57 being defined by an annular wall 58, slotted at 60 (Figure 3), for a purpose to be described, common separating web-like walls 61 (Figure 4), and a substantially circular wall 62 adjacent the motor shaft 35. The chambers 56 and 57 are separated from the pumping chamber 53 by means of a common wall 63. The wall 63 is provided with inlet passages 64, 64 intersecting grooves 65, 65 in the truncated cone-shaped portion 55 providing the communication between the inlet chamber 56 and the pumping chamber 53, and is also provided with an outlet passage 66 intersecting a slot 67 (Figure 3) in the truncated cone-shaped portion 55 providing a communication between the pumping chamber 53, the space around the motor shaft 35 and the discharge chamber 57. In addition to the passages thus described, one of the web-like walls 61 is provided with a passage 68 leading into the pumping chamber 53, the purpose of which will later become apparent and, also, the truncated cone-shaped portion 55 is provided with a discharge slot 70 (Figure 3) providing additional communication between the pumping chamber 53 and the space around the motor shaft 35. Since the above-described pumping chamber actually defines two pumping chambers, the need for an outlet from each side is apparent and such outlets are provided in the form of slots 67 and 70.

The lobe cone 54 is retained in position, on its lower side as viewed in Figure 1 of the drawings, by means of a drum-like retainer 71 fitting into a complementary shaped opening 72 in the housing 12 and on its upper side by an annular retaining member 73 and, also, by means of a locating pin or pins (not shown) received in the openings 74 (Figure 2) in the lobe cone. The retainer 71 has a cylindrical portion 75 surrounding the outer periphery of the lobe cone 54, and outwardly extending radial flange 76 and a radial annular plate-like portion or spacer 77 which terminates in a downwardly extending barrel portion 78, the inner periphery 80 of which is spaced from and receives the rotatable cylindrical portion 32 of the impeller 30. The plate-like portion or spacer 77 is also spaced from the mixed flow impeller 30 and from the annular plate-like portion 48 of the liquid seal pump rotor 47. Thus the spacer 77 acts to create a pressure drop between the pumping chambers of the pumps B and P, so that when there is no fuel in the pump B, the pump P's loss of liquid seal is held to the minimum by the labyrinth formed by inner periphery 80 and the cylindrical portion 32 of impeller 30. The retaining member 73 separates the pump P from the motor M and cooperates with the chamber defining walls 58, 61 and 62 to further define the chambers 56 and 57 and, also, serve as a support for a bearing 81 for the motor shaft 35. An O-ring seal 82 is provided between the flange 76 and the adjacent wall of the housing 12 to prevent the escape of fuel therebetween.

A pipe-like member or conduit 83 extends along the inlet conduit 21 and in the embodiment shown is coaxial therewith. An additional pipe-like extension or tubular member 84 is connected at one end with the pipe-like member 83 and at the opposite end is flared radially outwardly as at 85 to provide an inlet to the liquid seal pump inlet 86 communicating at one end with the inner cavity or closure formed by the bell-shaped housing H and at the other end with a passage 87 formed in housing 10 and which in turn communicates with the slot 60 and the inlet chamber 56 in the lobe cone 49 of the pump P to provide a free flow of fluid from inlet 86 to inlet chamber 56. Thus, there is provided a means for withdrawing air and vapor from within the enclosure cavity formed by the bell-shaped housing and directing this withdrawn portion to the inlet chamber 56 of pump P, while the passage 84 has been illustrated as positioned adjacent with the inlet conduits 21 and 22 of the main booster pump B, it is to be expressly understood that this passage need only be positioned to communicate with the cavity formed by the bell tank housing and the appended claims should be so interpreted. In my invention the important feature in connection with the inlet conduits 22 and 21 and inlet conduits 83, 84 and 87 is the distance between the secondary pump inlet 86 and the main booster pump inlet 28 as will be explained in more detail hereinafter.

The fuel supplied to the pumping chamber 53 will travel around with the rotor and by centrifugal action will follow the outline of the pumping chamber 53. By such arrangement, the fuel will be forced into and out of the chambers 52, defined by the vanes 51, through the slots 67 and 70 in the truncated cone-shaped portion 55 and around the motor shaft 35 to the outlet 66 and into the discharge chamber 57. The retaining member 73 is provided with a plurality of openings or passages 88 (only one of which is shown in Figure 1) providing a communication between the discharge chamber 57 and the interior of the motor housing 11, so that fuel discharged by the pump P is discharged into the motor housing 11, wherein it functions to cool the inter-working parts of the motor. In the first embodiment of my invention, as illustrated in Figure 1 the fuel from the motor housing 11 is discharged through a passage 90 formed in the housing 11 opposite from the discharge passages 88 of pump P. Discharge passage 90 is suitably coupled and in fluid communication with a pipe-like member 91 through a suitable coupling means 92 so that the fluid within the inner working parts of the motor M passes through a fire-resistant, screen-like means 94 in passage 90 and thence out to any source of low pressure such as the tank T. Pipe-like member 91 may be directly connected to the top portion of the bell housing H or may be connected to a block-like member 95 as shown in Figure 1. In either connection, sealing means, such as sealing ring 96, are provided to prevent leakage from the fuel tank T into the cavity formed by the bell-shaped housing H as will be apparent hereinafter. In addition to the passages 88, the retainer member 73 is provided with an opening (not shown) in alignment with the passage 68 in the lobe cone 54, previously described. If at any time the pump assembly is stopped, the fluid in the motor housing 11 will flow to pump P as a source of supply of fluid for priming purposes.

When the booster pump assembly is connected to the tank T, as previously described, a portion of the fuel in the tank T will flow into the bell housing H through the screening members 20 and opening 18. When the motor is energized, the booster pump impeller 30 and the liquid seal pump rotor 47 will be conjointly rotated. Upon initial and continued operation of the pumps the liquid seal pump impeller 47 creates a partial vacuum above the fuel level within the cavity of the bell tank housing H by withdrawing air and vapor from the cavity through its inlet 86. This partial vacuum causes fuel to rise to the inlet 86 which is a level sufficient to cover the main booster pump inlet opening 28 to the conduits 22 and 21 of the main mixed flow booster pump impeller 30.

As the operation of the pump continues, the liquid seal pump continues to withdraw fuel from the cavity and continues to maintain the level of the fuel within the bell tank sufficiently high to provide a constant source of supply of fuel for the mixed flow booster pump. Normally the vacuum creative ability of the liquid seal pump is sufficiently high to insure a continued source of fuel to enter the inlet 86 and into the pump inlet 28, the spill-over of fuel into the secondary pump inlet 86 regulates the suction capacity of the secondary pump and overcomes any inlet pressure losses incurred as the fuel passes from the main wing tank T through the inlets 18 of the bell tank housing. Fuel so withdrawn from the cavity is discharged into the motor housing 11 to provide the cooling of the working parts of the motor and thence out through the conduit formed by the screen 94, the coupling 92 and the tubing 91 to the wing tank of the aircraft. Concurrently, the continued operation of the pump assembly provides a source of fuel to enter the main booster pump inlet 28 and fuel is discharged by the impeller 30 into the scroll 44 and out through the discharge 45 for ultimate consumption by the aircraft.

An important aspect of my invention is in the arrangement of the secondary pump inlet 86 in communication with the inlet of the second or liquid seal pump P and the main booster pump inlet 28 in communication with the inlet of the booster pump B to provide a source of fuel for the main pump B regardless of the flight conditions. It can be seen that the primary purpose of the secondary pump is to reduce the pressure in the bell tank, as hereinabove stated, i.e., to create a negative pressure differential between the enclosure or cavity formed by the bell tank H and the pressure in the wing tank T so that the flow of fuel is constantly induced into the bell tank and to rise to the height of the secondary pump inlet 86 thus covering the main pump inlet 28 and maintain a prime regardless of the fuel level in the main tank T. Obviously, when the aircraft is in an inverted position the main booster pump B will have a fuel supply equal to the height of the inlet 28 with respect to the bell tank inlets 18 which fuel level or head is designated in the drawing as L–1. When the aircraft is inverted, it is obvious that the amount of fuel retained in the bell tank housing H will be the amount between the top of the inlets 18 and the lower level of the opening of the inlet 28, which amount of fuel will be the source of supply of fuel to the main booster pump B. This level or head can be determined by the requirements of inverted flight so not to uncover the main booster inlet 28. It is important to note at this point that the inlets 18 with the wall-like members 19, in the embodiment shown, are so designed and arranged that the fuel will not flow out until the air enters the cavity formed by the bell tank H when inverted. If it is not necessary to cool the motor because of the particular characteristics of any selected motor, a reservoir could be provided between the outlet conduit 91 and the discharge passages 88 as a source of priming fluid for the pumps. The height of the bell tank, indicated in the drawing as L–2 is selectively chosen that when the aircraft returns to its normal or positive G flight condition in effect the level of fuel remaining in the tank should at least be the height or level, indicated as L–3 in the drawings, which obviously is sufficiently high to cover the inlet 28, at which time the liquid seal pump P again acts to cause the fuel level in the cavity to rise thus providing a constant source of fuel for the main booster pump B. Obviously, during this time secondary pump inlet 86 is in the vapor or air designated as L–4 above the level of the fuel in the cavity for a short length of time.

As can be seen, the disposition of the inlets to the primary booster pump B and the secondary liquid seal pump P are important and should be carefully selected according to the expected flight conditions. Under negative G conditions as well as under inverted and negative G conditions, the operation of the liquid seal pump P and the main booster pump B and the cooperation between the bell tank and the inlets 86 and 28 are similar. All that is required is that the fuel in the main tank T remain sufficiently high to cover the inlets 18 when the aircraft returns to its normal flight conditions.

Turning now to the second embodiment of my invention, as illustrated in Figure 6, the major difference between this embodiment and the previously described embodiment is in the particular placement of the pumps Ba and Pa relative to the motor Ma, and also, the fact that no fuel is pumped through the motor housing 11a. The structure of the pumps are substantially the same as that shown and described with reference to Figures 1 through 5 and similar parts are referred to in this figure with the same reference numeral with the suffix a.

In this embodiment, the booster pump Ba is disposed at one end of the motor Ma adjacent the bell tank and the liquid seal pump Pa is disposed at the opposite end of the motor Ma. An inlet conduit 21a having a main booster pump inlet 28a and an inlet conduit 84a with a second or inlet seal pump inlet 86a is disposed within the bell type housing Ha and functions in a manner as described in connection with the pumps shown in Figures 1 through 5.

In the third embodiment of my invention as illustrated in Figure 7, the primary booster pump Bb and the secondary liquid seal pump Pb are mounted within the bell tank Hb in an inverted manner so that the main booster pump inlet 28b is more directly connected to the pumping inlet 42b. In this embodiment, the relationship between the inlet 86b to the liquid seal pump Pb and the inlet 26b to the main booster pump Bb are arranged to function in a manner described in connection with the pumps shown in Figures 1 through 5. Since the liquid seal pump in this embodiment discharges directly through conduit 91b and thence into the main tank instead of discharging into the electric motor housing 11b as in the case of the pumps shown in Figures 1 through 6, the liquid seal pump Pb is additionally provided with a reservoir 97b in fluid communication with the discharge thereof to provide a source of prime fluid for the liquid seal pump if the conditions warrant the need for it. A passage 98b for fluid communication between the main booster pump discharge 45b and the electric motor housing 11b may be provided in this embodiment whereby a portion of the fuel discharged by the main booster pump Bb may be directed to the working parts of the electric motor Mb to cool the latter. Fire-resistant, screen-like means 94b functions as a discharge conduit for the fuel in housing 11b in a manner similar to that shown in Figure 1. Since the structures of the pumps shown in this embodiment are substantially the same as that shown and described with reference to Figures 1 through 5, similar parts are referred to in this figure with the same reference numerals and with the suffix b and no further description is deemed necessary.

It is to be expressly understood, that this invention, in its broadest interpretation consists of an arrangement of two pumps, with an enclosure submerged in a source of fluid thereby one of the pumps continually reduces the pressure within the enclosure, which substantially fills the enclosure with fluid as a source of supply to the other pump while mounted in a horizontal position. It is not to be limited to the specific types of pumps above described, these types being employed to facilitate description only. In this connection, a centrifugal booster pump may be employed in lieu of the specific mixed flow booster pump and any other suitable pump, capable of performing the function, may be employed in lieu of the specific liquid seal pump.

Where herein the various parts of this invention have been referred to as located in a right or left or upper and lower position, it will be understood that this is done solely for the purpose of facilitating description and that such references relate only to the relative positions of the parts as shown in the accompanying drawings.

Also, it will be understood that many changes and modifications may be made without departing from the spirit and scope of the invention and that the invention is designed and comprehend within the scope of the appended claims which should be given a scope consistent with the prior art.

I claim:

1. A first pump having an inlet and an outlet, a second pump having an inlet and an outlet, and an enclosure means covering the inlet of both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted.

2. A first pump having an inlet and an outlet, a second pump having an inlet and an outlet, an enclosure means covering the inlet of both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted, and means for conjointly driving said first and second pumps.

3. A first pump having an inlet and an outlet, a second pump having an inlet and an outlet, an enclosure means covering the inlet of both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted, means for conjointly driving said first and second pumps, and means for cooling said last mentioned means with said fluid from one of said pumps.

4. A first pump having an inlet and an outlet, a second pump having an inlet and an outlet and an enclosure means comprising a hollow housing covering both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted.

5. A first pump having an inlet and an outlet, a second pump having an inlet and an outlet, an enclosure means comprising a hollow housing covering both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted, and means for conjointly driving said first and second pumps.

6. A first pump having an inlet and an outlet, a second pump having an inlet and an outlet, an enclosure means comprising a hollow housing covering both pumps in a predetermined spaced relation from said inlets, said enclosure means having a top portion and a bottom portion, said inlet of said first pump being spaced closer to said top portion than to said bottom portion, said second pump reducing the pressure in said enclosure so that fluid from a source flows into said enclosure and covers the inlet of the first pump to provide a continuous source of fluid for said first pump whereby the quantity of fluid in said enclosure means provided by said predetermined spaced relation covers said inlet of said first pump when said enclosure means is inverted, means for conjointly driving said first and second pumps, and means for cooling said last mentioned means with said fluid from one of said pumps.

7. A pump assembly comprising, a pump including a pumping chamber provided with an inlet thereto and a discharge therefrom, an impeller means received in said pumping chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, and means reducing pressure in said enclosure to allow a flow of fluid from a source into said enclosure and thence into said inlet whereby the quantity of fluid in said enclosure provided by said predetermined spaced relation covers said inlet when said enclosure is inverted.

8. A pump assembly comprising, a pump including a pumping chamber provided with an inlet thereto and a discharge therefrom, an impeller means received in said pumping chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, and means reducing pressure in said enclosure to allow a flow of fluid from a source into said enclosure and thence into said inlet whereby the quantity of fluid in said enclosure provided by said predetermined spaced relation covers said inlet when said enclosure is inverted, said last-named means comprising a second pump including a pumping chamber provided with an inlet thereto and an outlet therefrom, and a rotor means received in said second-named pumping chamber for pumping vapor and fluid from said enclosure and said second-named inlet through said second-named chamber to said outlet.

9. A pump assembly comprising, a pump including a pumping chamber provided with an inlet thereto and a discharge therefrom, an impeller means received in said pumping chamber for pumping fluid from said inlet through said chamber to said discharge, an enclosure covering said inlet in a predetermined spaced relation, and means reducing pressure in said enclosure to allow a flow of fluid from a source into said enclosure and thence into said inlet whereby the quantity of fluid in said enclosure provided by said predetermined spaced relation covers said inlet when said enclosure is inverted, said last-named means comprising a second pump including a pumping chamber provided with an inlet thereto and an outlet therefrom, and a rotor means received in said second-named pumping chamber for pumping vapor and fluid from said enclosure and said second-named inlet through said second named chamber to said outlet, said enclosure comprising a hollow housing covering said pumps.

10. A pump assembly comprising, a pump including a conically-shaped pumping chamber provided with an inlet thereto and a scroll-shaped discharge therefrom, a complementary-shaped impeller means provided with a plurality of spirally arranged vanes thereon, received in said pumping chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, and means reducing pressure in said enclosure to allow a flow of fluid from a source into said enclosure and thence into said inlet whereby the quantity of fluid in said enclosure provided by said predetermined spaced relation covers said inlet when said enclosure is inverted.

11. A pump assembly comprising, a pump including a conically-shaped pumping chamber provided with an inlet thereto and a discharge therefrom, a complementary-shaped impeller means provided with a plurality of spirally arranged vanes thereon, received in said chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, and means reducing pressure in said enclosure to allow a flow of fluid from a source into said enclosure and thence into said inlet whereby the quantity of fluid in said enclosure provided by said predetermined spaced relation covers said inlet when said enclosure is inverted, said last-named means comprising a second pump including a pumping chamber provided with an inlet thereto and an outlet therefrom, a rotor means received in said second-named pumping chamber for pumping vapor and fluid from said second-named inlet through said second-named chamber to said outlet.

12. A pump assembly comprising, a pump including a conically-shaped pumping chamber provided with an inlet thereto and a scroll-shaped discharge therefrom, a complementary-shaped impeller means provided with a plurality of spirally arranged vanes thereon received in said chamber for pumping fluid from said inlet through said chamber to said discharge, an enclosure covering said inlet in a predetermined spaced relation, means reducing pressure in said enclosure to allow a flow of fluid from a source into said inlet whereby the quantity of fluid in said enclosure provided by said predetermined spaced relation covers said inlet when said enclosure is inverted, said last-named means comprising a second pump including a pumping chamber provided with an inlet thereto and an outlet therefrom, and a rotor means received in said second-named pumping chamber for pumping vapor fluid from said enclosure and second-named inlet through said second-named chamber to said outlet, said enclosure comprising a hollow housing covering both pumps, means providing communication between said discharge and said second-named inlet and means for conjointly rotating said impeller means and said rotor means.

13. A pump assembly comprising, a pump including a conically-shaped pumping chamber provided with an inlet thereto and a scroll-shaped discharge therefrom, a complementary-shaped impeller means provided with a plurality of spirally arranged vanes thereon, received in said chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, means reducing pressure in said enclosure to allow a flow of fluid from a source into said enclosure and thence into said inlet whereby the quantity of fluid in said enclosure provided by said predetermined spaced relation covers said inlet when said enclosure is inverted, said last-named means comprising a second pump including a double lobe pumping chamber provided with an inlet thereto and an outlet therefrom, and a rotor means provided with a plurality of axially extending circularly arranged curved vanes thereon, received in said second-named pumping chamber for pumping vapor and fluid from said enclosure and second-named inlet through said second-named chamber to said outlet.

14. A pump assembly comprising, a pump including a pumping chamber provided with an inlet thereto and a discharge therefrom, an impeller means received in said pumping chamber for pumping fluid from said inlet through said chamber to said discharge, an enclosure covering said inlet in a predetermined spaced relation, said enclosure having a top portion and a bottom portion, said inlet being spaced closer to said top portion than to said bottom portion, and means reducing pressure in said enclosure to allow a flow of fluid from a source into said enclosure and thence into said inlet whereby the quantity of fluid in said enclosure provided by said predetermined spaced relation covers said inlet when said enclosure is inverted, said last-named means comprising a second pump including a double lobe pumping chamber provided with an inlet thereto and an outlet therefrom, and a rotor means provided with a plurality of axially extending circularly arranged curved vanes thereon, received in said second-named pumping chamber for pumping vapor and fluid from enclosure and said second-named inlet through said second-named chamber to said outlet.

15. A pump assembly comprising, a pump including a pumping chamber provided with an inlet thereto and a discharge therefrom, an impeller means received in said pumping chamber, an enclosure covering said inlet in a predetermined spaced relation, means reducing pressure in said enclosure to allow a flow of fluid from a source into enclosure and said inlet whereby the quantity of fluid in said enclosure provided by said predetermined spaced relation covers said inlet when said enclosure is inverted, said last-named means comprising a second pump including a double lobe pumping chamber provided with an inlet thereto and an outlet therefrom, a rotor means provided with a plurality of circularly arranged curved vanes thereon received in said second-named pumping chamber for pumping vapor fluid from said enclosure and second-named inlet through said second-named chamber to said outlet, said enclosure comprising a hollow housing covering said pumps, means providing communication between said discharge and said second-named inlet, and means for conjointly rotating said impeller means and said rotor means.

References Cited in the file of this patent

UNITED STATES PATENTS

| | | |
|---|---|---|
| 1,718,294 | Jennings | June 25, 1925 |
| 1,799,590 | Kiefer | Apr. 7, 1931 |
| 2,089,691 | Cross | Aug. 10, 1937 |
| 2,407,748 | Schmidt | Sept. 17, 1946 |
| 2,433,408 | Tollefsen | Dec. 30, 1947 |
| 2,553,066 | Southern | May 15, 1951 |
| 2,581,828 | Adams | Jan. 8, 1952 |